Figure 3B:
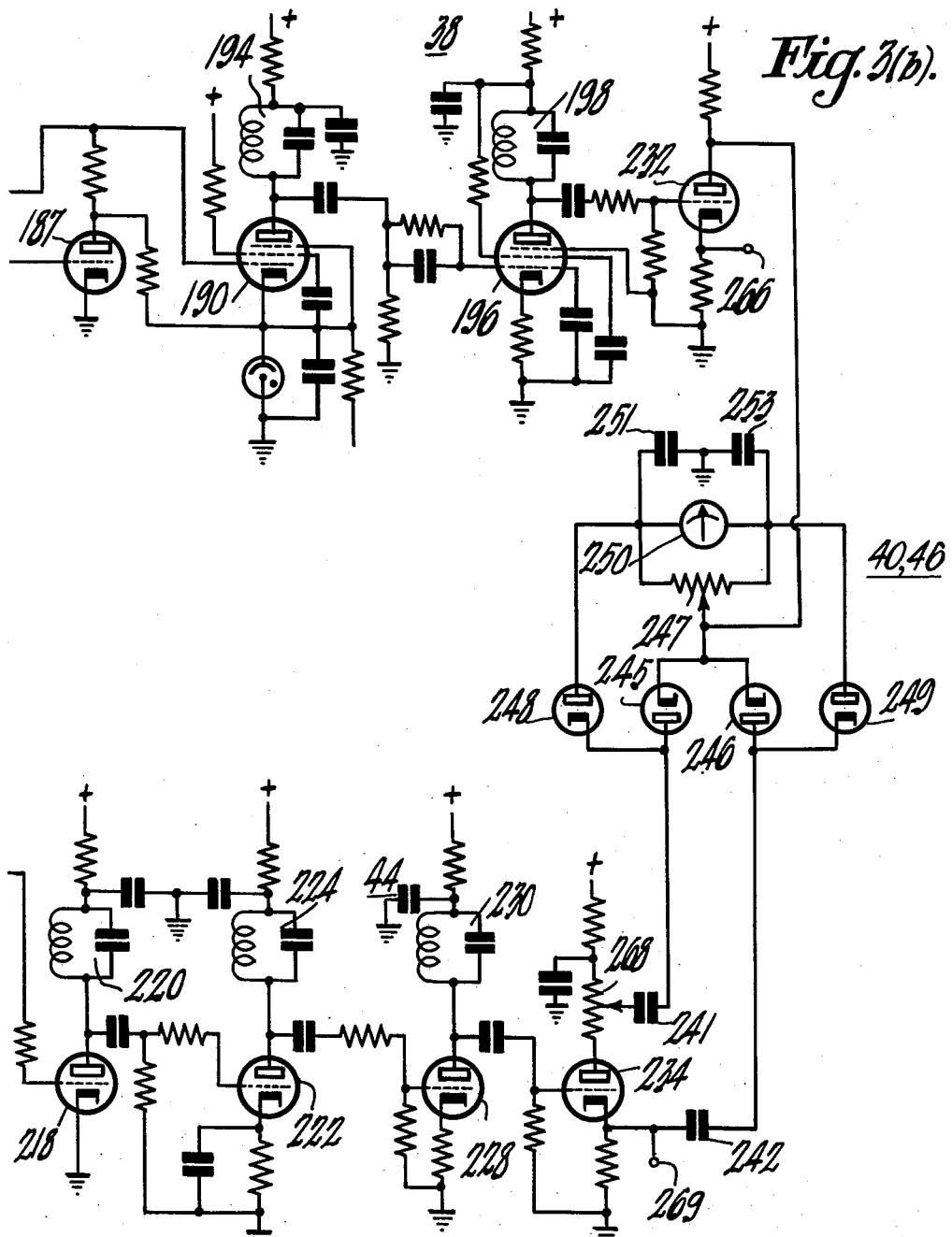

Oct. 1, 1957  H. FRENCH ET AL  2,808,562
ENVELOPE DELAY MEASURING EQUIPMENT
Filed Nov. 26, 1954  6 Sheets-Sheet 1
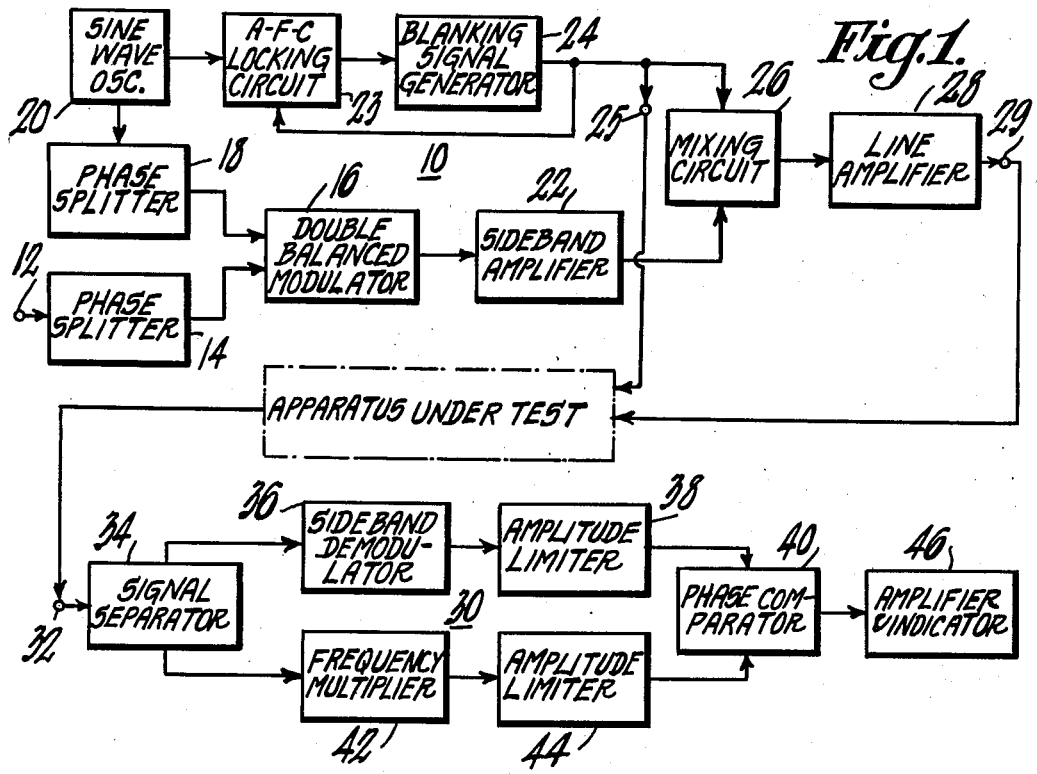
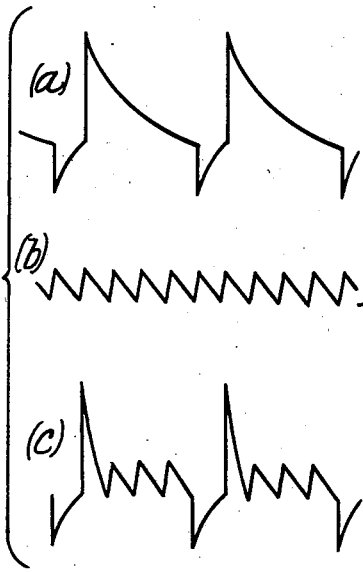
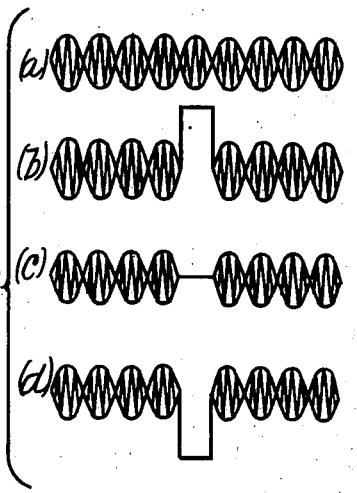
INVENTORS
HUBERT FRENCH &
RALPH C. KENNEDY
BY
ATTORNEY

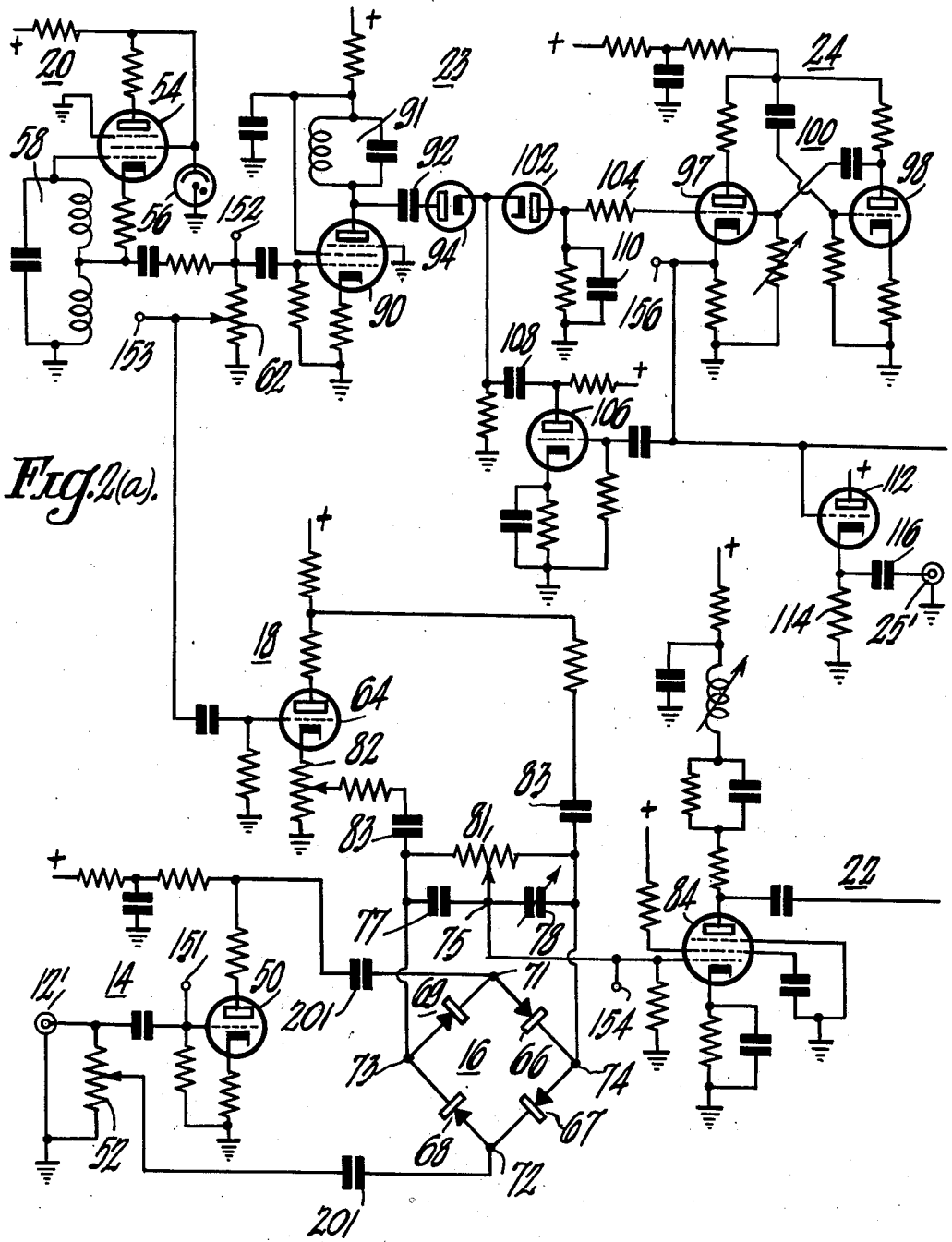

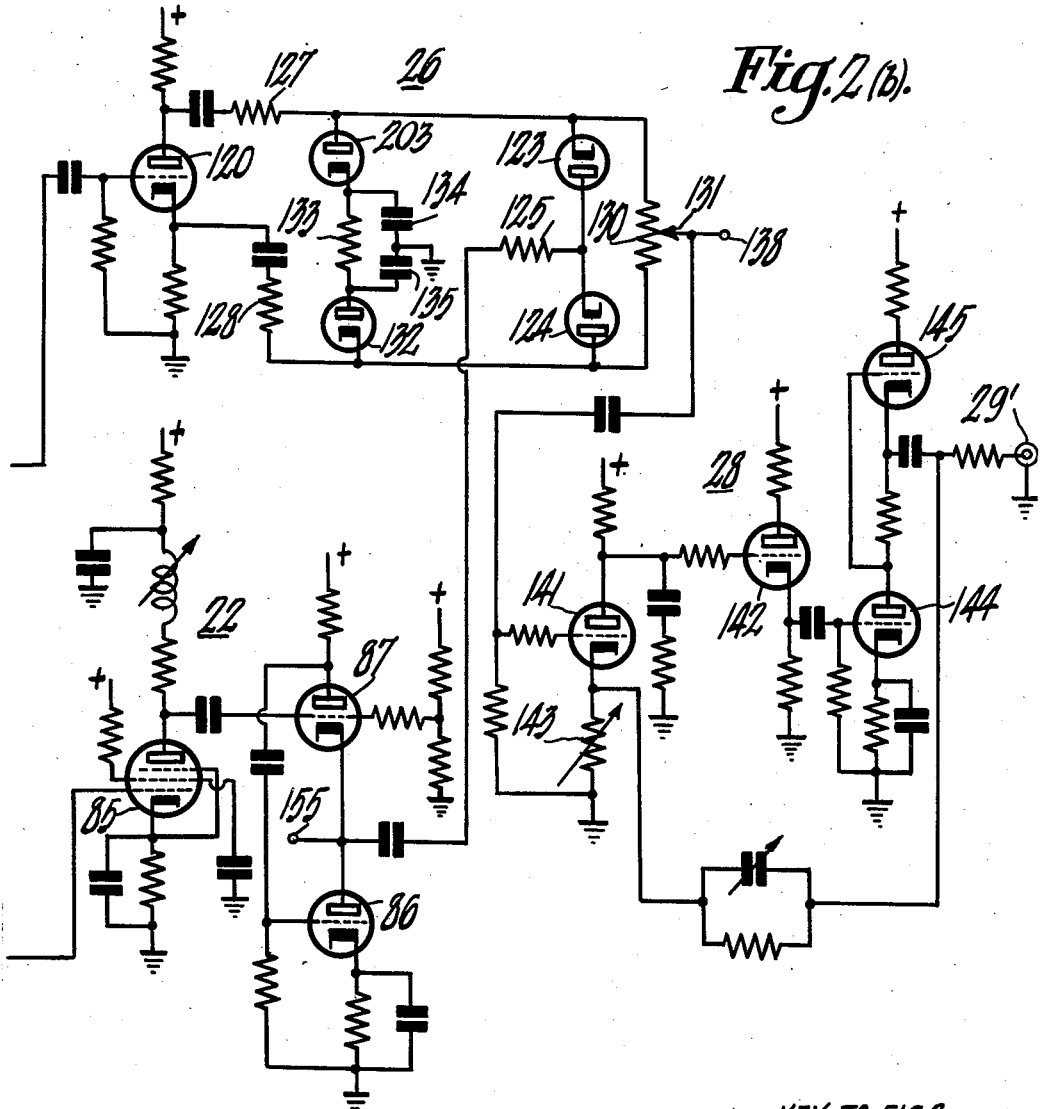

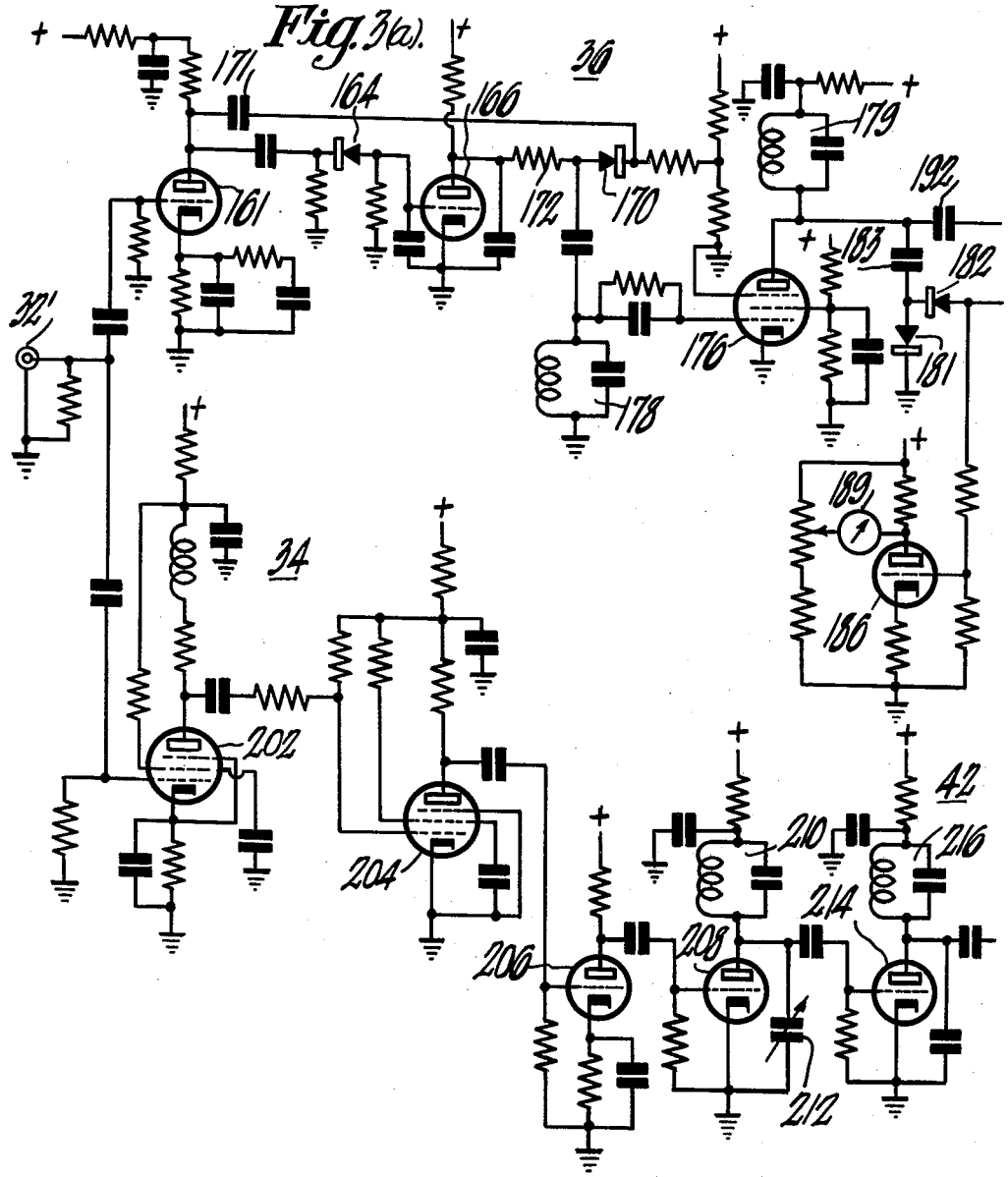

INVENTORS
HUBERT FRENCH &
RALPH C. KENNEDY
BY
ATTORNEY

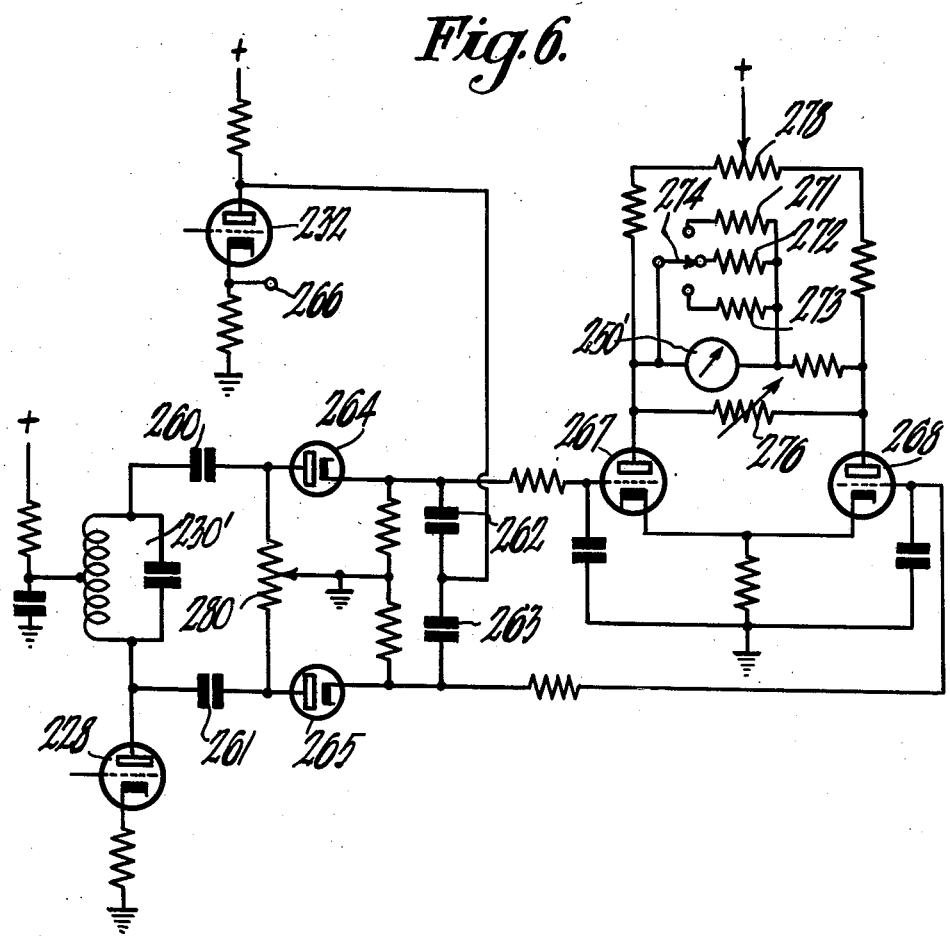

United States Patent Office 2,808,562
Patented Oct. 1, 1957

2,808,562

ENVELOPE DELAY MEASURING EQUIPMENT

Hubert French, New York, and Ralph Craig Kennedy, Queens Village, N. Y., assignors to Radio Corporation of America, a corporation of Delaware Application November 26, 1954, Serial No. 471,226

The terminal 15 years of the term of the patent to be granted has been disclaimed 4 Claims. (Cl. 324—57)

The invention relates to television signal broadcasting and the like, and it particularly pertains to apparatus for measuring envelope delay, or the rate of change of phase angle with frequency, of signals passing through the television transmitting apparatus.

The Federal Communications Commission has laid down strict requirements for the maintenance of envelope delay of the radiated signal relative to the average envelope delay between 50 kc. and 200 kc. to within ±.05 microsecond at the color sub-carrier frequency of 3.579 mc. so that it is evident that measuring apparatus must be available to make envelope delay measurements to a very high degree of sensitivity. Envelope delay measurements are required to be made on all television signal translating apparatus and networks involved in generating and broadcasting a color television signal. Therefore these measurements must be made on through networks, that is those networks having the input terminals widely separated from the output terminals as well as component apparatus where both sets of terminals are readily accessible. It is also necessary to measure envelope delay on those systems which may contain clamping circuits.

Equipment has been suggested in the past for measuring envelope delay with satisfactory results and the test equipment according to the invention is improved in that it does not require a return loop for time reference and it will work equally well with clamped and unclamped circuits.

An object of the invention is to provide improved equipment for measuring relative envelope delay in television signal translating systems.

Another object of the invention is to provide improved equipment for measuring relative envelope delay without requiring a return loop for time reference.

A further object of the invention is to provide equipment for measuring envelope delay which will operate equally well whether clamped or unclamped circuits are included in the apparatus or network under consideration.

Still another object of the invention is to measure the relative envelope delay existing between blanking or synchronizing pulses and the higher frequency components of the video signal in passage through a television signal translating system.

A still further object of the invention is to provide relative envelope delay measuring equipment of improved sensitivity and ready straightforward indication of the delay.

A more specific object of the invention is to provide relative envelope delay measuring equipment capable of measuring a delay of 0.002 microsecond.

The objects of the invention are obtained in equipment for measuring relative envelope delay comprising test signal generating apparatus and test signal measuring apparatus. The signal generating apparatus produces a signal comprising blanking pulse and sideband modulation components for application to the apparatus under test. The relative delay between the blanking pulse and the sideband components brought about by the response of the apparatus under test to these components is determined by the test signal measuring apparatus. By using the pulse components as a reference signal, no return loop is required, and each apparatus is complete unto itself, so that long coaxial cables and the like can be measured with ease. The test signal generating apparatus comprises a fixed modulation frequency generating circuit which is coupled in push-pull relationship to a doubly balanced modulating circuit to which there is also applied push-pull energy from a continuously variable sine wave frequency source. The resultant waveform at the output of the doubly balanced modulating circuit includes only upper and lower sideband frequencies, which signal is amplified and to which reference timing or blanking pulses are added in a blanking pulse inserting circuit. These blanking pulses provide both time reference and drive for the clamping circuits. The blanking pulses are obtained from a blanking pulse generating circuit operating at a submultiple of the modulation frequency. The modulation frequency oscillator is also connected to the sensing circuit of an automatic synchronizing control which compares the modulation frequency with the blanking frequency, even though the latter is a submultiple of the other, to produce a D.-C. signal which is applied to the input circuit of the blanking signal generating circuit to maintain frequency stability. The signal transmitted appears as a series of recurring modulated envelopes of frequency double the modulation frequency interposed between blanking pulses which can be adjusted to be either positive or negative as desired. This test signal is then applied to the input terminals of the electric wave translating apparatus under test, whether it be a component complete at the point of signal generation, or a long distance transmission line network, or the like.

The output terminals of the apparatus under test are connected to the measuring equipment where the test signal enters and encounters a signal separating circuit which separates the blanking pulses from the sideband frequency waves. The blanking pulse components are applied to frequency multiplying circuits where the frequency is multiplied up to the frequency difference between the sidebands. The sideband-spacing frequency components are applied through another path to a sideband-spacing frequency demodulating circuit and amplified at a frequency equal to the sideband spacing. These two signals are fed into a phase comparing circuit where the difference of the relative phases between the two signals is determined and the resultant signal applied to an indicating circuit arranged to provide an accurate visual indication of the relative envelope delay.

In order that the practical aspects of the invention may be more fully appreciated, an embodiment of the invention, given by way of example only, is described below with reference to the accompanying drawing forming a part of the specification and in which:

Fig. 1 is a block diagram of the envelope delay measuring system according to the invention;

Fig. 2 (sections *a* and *b* being taken together) is a schematic diagram of an embodiment of test signal generating apparatus for performing the functions indicated in Fig. 1;

Fig. 3 (sections *a* and *b* being taken together) is a schematic diagram of an embodiment of test signal measuring apparatus for performing the functions indicated in Fig. 1;

Fig. 4 and Fig. 5 are graphical representations of waveforms obtained with test signal generating apparatus according to the invention as illustrated in Fig. 2; and Fig. 6 is a schematic diagram of an alternate phase comparing and indicating circuit according to the invention.

The basic theory involved in the measurement of envelope delay relates to the phase shift produced in a signal wave of energy at two frequencies spaced $\Delta w = 2\pi\Delta f$ apart. If such a signal is passed through an electric wave translating network the energy will appear at the output shifted in phase with respect to the phase at the input according to the phase shift at each frequency caused by the traverse through the network.

If the input signal is written $$e_{in} = \cos(2\pi f_1 t + \theta_1) + \cos(2\pi f_2 t + \theta_2) \quad (1)$$

the output signal will have the form $$e_{out} = E_1 \cos(2\pi f_1 t + \theta_1 + \varphi_1) + E_2 \cos(2\pi f_2 t + \theta_2 + \varphi_2) \quad (2)$$

In Equations 1 and 2, $f_1$ and $f_2$ signify two different sine wave frequencies, $\theta_1$ and $\theta_2$ stand for the phases of the respective frequencies $f_1$ and $f_2$, while $\varphi_1$ and $\varphi_2$ represent the shifts in phase of the respective frequencies $f_1$ and $f_2$ as they pass through a system under test.

If the spacing $\Delta f$ between $f_1$ and $f_2$ is small enough so that the envelope delay is constant in the interval $\Delta f$ then the expression for the envelope delay time $T_e$ can be written $$T_e = \frac{d\varphi}{d\omega} = \frac{\Delta\varphi}{2\pi\Delta f} = \frac{\varphi_2 - \varphi_1}{2\pi(f_2 - f_1)} \quad (3)$$

The expression above clearly indicates the limit of accuracy of envelope delay measurement. Suppose that a coaxial cable is being measured which is misterminated causing a reflection or echo to appear on the line. If the period of $\Delta f$ used in making the envelope delay measurement is equal to the period of the reflection on the line, the envelope delay will appear to be perfect since the two frequencies will ride along on identical points of the standing wave, but will be 360 degrees apart. Thus phase variations will be completely lost to envelope delay measurement. This condition may be circumvented by choosing a smaller value for $\Delta f$.

Another consideration which points to a smaller value of $\Delta f$ is the low frequency limit of measurement. Results thus far indicate that the lowest frequency at which the envelope delay may be measured accurately is about 3 to 3.5 times $\Delta f/2$. If $\Delta f/2$ is 100 kc. the lowest frequency at which the envelope delay of a system may be determined is about 300 to 350 kc.

The lower limit for $\Delta f$, however, is dictated by another consideration. If $\Delta f$ is small, phase variations, unless great, are hard to detect in conventional phase detectors. This problem may be solved by multiplying up the two frequencies forming $\Delta f$ after being passed through the unknown. This produces a greater phase difference at the higher frequency. As an example, the time for 1 degree at 100 kc. is 0.0278 $\mu$ sec. If the 100 kc. is multiplied to 1 mc., 0.0278 $\mu$ sec. is equal to 10 degrees.

Referring to Equation 3, it is seen that the actual determination of $T_e$ reduces to the measurement of $\varphi_2 - \varphi_1$, since we can measure $f_2 - f_1$.

Using a square law detector for recovering the output signal gives the following expression for the output voltage $$E_{out}^2 = E_1^2 \cos^2(2\pi f_1 t + \theta_1 + \varphi_1) + E_2^2 \cos^2(2\pi f_2 t + \theta_2 + \varphi_2) + 2E_1 E_2 \cos(2\pi f_1 t + \theta_1 + \varphi_1)\cos(2\pi f_2 t + \theta_2 + \varphi_2) \quad (4)$$

This then is equal to $$E_{out}^2 = \frac{E_1^2 + E_2^2}{2} + \frac{E_1}{2}\cos(4\pi f_1 t + 2\theta_1 + 2\varphi_1) + \frac{E_2}{2}\cos(4\pi f_2 t + 2\theta_2 + 2\varphi_2) + E_1 E_2 \cos(2\pi(f_2 + f_1)t + \theta_1 + \theta_2 + \varphi_1 + \varphi_2) + E_1 E_2 \cos(2\pi(f_2 - f_1)t + \theta_2 - \theta_1 + \varphi_2 - \varphi_1) \quad (5)$$

The first term on the right side of this expression is the D.-C. component. The next three terms are all at frequencies approximately $2f$. The last term is at a frequency equal to the difference of the two frequencies or $\Delta f$. This term is also shifted in phase by the difference in phase shift between the two frequencies.

If the detected output is then passed through tuned circuits resonant to $f_2 - f_1$, all the terms in Equation 5 above are eliminated with the exception of $$E_1 E_2 \cos(2\pi\Delta ft + \theta + \Delta\varphi) \quad (6)$$

Measurement of the phase of this detected output relative to the same signal $E_{in}$ (where $\Delta\varphi = 0$) gives $$\theta + \Delta\varphi - \theta = \Delta\varphi \quad (7)$$

which shows that the phase of the $\Delta f$ signal is $\Delta\varphi$. Since $\Delta f$ is known, then $$T_e = \frac{\Delta\phi}{2\pi\Delta f} \quad (8)$$

All that is necessary to get the delay at some other frequency is to change both $f_1$ and $f_2$, keeping their difference $\Delta f$ constant. Then $$T_{e_1} = \frac{\Delta\phi_1}{2\pi\Delta f} \quad (9)$$

One way to measure $\Delta\varphi$ is to feed the sine wave at frequency $\Delta f$ of unknown phase into a comparator along with a sine wave of $\Delta f$ but with constant phase. The output of the comparator is then proportional to $K$ sine $\Delta\varphi$. If the scale of the indicating meter has a zero center and reads $\pm 90°$ for full scale deflection, then $I$ is the current for $90°$ deflection and $2I$ is the current for full scale deflection. Then $2I = \sin \varphi$ or $\Delta\varphi = \sin^{-1} I/2$. Equation 8 may now be written $$T_e = \frac{\sin^{-1} 2I}{2\pi\Delta f}$$

which allows the determination of envelope delay time when $\Delta f$, that is $f_2 - f_1$, is known, by reading $I$ from a meter. In fact, the meter may be calibrated directly in microseconds of envelope delay, provided $\Delta f$ is fixed. A more useful calibration for the meter is phase angle in degrees plotted sinusoidally, since the value of $\Delta f$ may be changed and the meter scale used without any change. It is a simple matter to correlate phase angle and time for a given value of $\Delta f$.

Referring to Fig. 1, there is shown a functional diagram of the relative envelope delay time measuring equipment according to the invention, comprising test signal generating apparatus 10 for producing a test signal which is applied to the input of the electric wave translating apparatus under test, to the output of which is connected the test signal measuring apparatus 30. A sine wave carrier from a standard signal generator having a continuously variable frequency range is applied to the carrier wave input terminals 12 which are connected to a phase splitting circuit 14 which delivers both phases to a balanced modulating circuit 16. The modulating circuit 16 also receives two phases of modulating wave by way of another phase splitting circuit 18 connected to a modulation frequency wave generating circuit 20. The modulating circuit 16 is of the double balanced type, so that the output thereof consists of two frequencies which are spaced on either side of the carrier frequency and comprise the upper and lower sideband components of modulation. These components are amplified in an amplifying circuit 22. Another output from the modulation frequency wave generating circuit 20 is applied through an automatic frequency controlling circuit 23 to a blanking signal generating circuit 24 for generating blanking pulses at a given recurrence frequency harmonically related to the modulation frequency. Blanking pulses are made available at output pulse terminals 25 for keying any clamping circuits that may be included in the apparatus under test.

The output of the sideband amplifying circuit 22 is connected to a mixing circuit 26 wherein blanking pulses derived from the blanking signal generating circuit 24 are interposed much in the same manner as in television broadcast signal transmitting equipment. The test signal obtained at the output of the mixing circuit 26 is preferably amplified in a studio type line matching and amplifying circuit 28 for presentation at the test signal output terminals 29.

The test signal as modified by the network or apparatus under test is then applied to the test signal measuring input terminals 32 connected to a signal separating circuit 34. The signal separating circuit 34 delivers the sideband components through a sideband-spacing frequency demodulating circuit 36 after which the sideband component wave is limited in amplitude in a limiting circuit 38 for application to a phase comparng circuit 40. A frequency multiplying circuit 42 is connected to the signal separating circuit 34 to multiply the blanking pulse frequency up to the sideband-spacing frequency, or the difference in frequency between the side band signals, and the output wave is then limited in amplitude by a limiting circuit 44 for application to the phase comparing circuit 40. The output of the phase comparing circuit 40 is amplified and presented to an indicating device 46 where the envelope delay may be readily determined by visual means, preferably in the form of a meter, but oscillographic display or the like may be used if desired.

An excellent example of circuitry for performing the functions of the test signal generating apparatus 10 is shown in Fig. 2. A sine wave signal from a signal generator having a continuously variable frequency range from about 200 kc. to 100 mc., with an amplitude which can be maintained at abount 0.3 volt peak-to-peak over the entire range, is applied to the carrier wave input terminals 12', shown in Fig. 2(a), and applied to the input circuit of a vacuum tube 50 forming a part of the phase splitting circuit 14. As shown, phase splitting is accomplished by deriving an in-phase potential from the input potentiometer 52 and an out-of-phase or antiphase component by inverting the carrier input wave in the triode amplifier tube 50. The in-phase and the antiphase components are then delivered to the doubly balanced modulating circuit 16. It should be understood that any type of phase splitting circuitry may be used as desired, for example the paraphase amplifiers which are used elsewhere in this equipment.

The other input to the doubly balanced modulating circuit 16 is obtained from a fixed modulation frequency sine wave oscillating circuit 20 comprising a pentode vacuum tube 54. The screen potential of the oscillator tube 54 is stabilized by means of a gaseous discharge voltage regulator 56 so that the output potential at the cathode circuit of the tube is extremely stable, within ±5 cps. after warm up. The frequency of the sine wave oscillator 20, which is determined by the resonant circuit 58, may be any one of a desired range of frequencies but preferably is 100 kc. At this modulation frequency the lowest carrier wave frequency of the order of 3.5 times the modulation frequency is 350 kc. A sine wave of adjustable amplitude is obtained from an output potentiometer 62 and applied to the phase splitting circuit 18 comprising a paraphase amplifier triode 64, which phase splitting arrangement is well known. A stage of amplification before the paraphase amplifier may be necessary or desirable to obtain the desired signal level. If desired, other forms of oscillator 20 and phase splitting circuit 18 may be used, with satisfactory results.

Leads from the anode and the cathode circuits of the paraphase amplifier tube 64 are connected to the doubly balanced modulator 16. While known forms of balanced modulator circuits may be used to perform the function required, the circuit shown in Fig. 2(a) is of much higher stability and is much simpler to adjust than any known circuits. This doubly balanced modulator comprises four unilateral impedance devices shown here as semi-conducting diode elements 66–69 which are connected in series to form a ring continuously conducting in a given direction. These diode elements may be vacuum tube rectifiers or semi-conductor devices or the like. Preferably, germanium diode elements are used in the interest of low power consumption, low cost and extremely small size as compared to other types of diodes. Opposing diagonals 71, 72 form the carrier input terminals and the remaining diagonals 73, 74 form the modulation input terminals. The output of the modulating circuit is derived between a point of fixed reference potential and the output terminal 75, which is connected to the modulation input terminals 73, 74 by means of capacitors 77 and 78, respectively. Ideally, these capacitors are identical in value, but at least one of them is preferably adjusted so that if there is a slight phase unbalance in the modulation source, the ratio can be adjusted to create a modulation frequency null between the output terminal 75 and the point of fixed reference potential, or ground. In this doubly balanced modulator, the original 100 kc. modulation frequency and the carrier frequency supplied by the signal generator are both suppressed, leaving only the upper and lower side components of modulation.

The modulation frequency wave which is applied in a balanced manner across the terminals 73, 74 does not appear at the output terminal 75 because the latter is electrically situated at the null point of the modulation frequency wave, so that only sidebands appear at the output terminal as a result of instantaneous unbalances in current flow through the diode elements forming the arms of the bridge. The appearance of the sideband frequency wave is caused by the modulation wave current alternately opposing and aiding the flow of carrier wave current. The unbalance then occurs at frequencies which are equal to the sum and difference of the carrier and modulation frequencies. A potentiometer 82 is coupled from the modulation input terminals 73 to ground, for equalizing the modulation input voltage with respect to ground. When properly adjusted, this doubly balanced modulating circuit 16 produces two sideband frequencies $f_1$ and $f_2$ which are $\Delta f$ apart. In the example given, $\Delta f$ is $2 \times 100$ or 200 kc. representing the products from modulating the carrier wave signal by the 100 kc. signal generated by the oscillator 20.

Sine wave output at 100 kc. is also obtained from the cathode circuit of the oscillator tube 54 and amplified in a tuned buffer amplifier comprising a pentode vacuum tube 90, serving as the reference frequency translating tube of an automatic frequency control circuit for controlling the output frequency of a square wave generating reciproconductive circuit 100 forming the blanking signal generator 24. It should be understood that according to the invention the reciproconductive circuit 100 of the A. F. C. circuit may have an output frequency either equal to the reference frequency or to a submultiple thereof, as is the present case.

The term reciproconductive circuit as used herein is construed to include all plural-controlled-electron-flow-path-device circuit arrangements in which conduction is reciprocated between two paths each of which contains at least one controlled electron flow path device. Examples of controlled electron flow path devices as the term is construed herein are high vacuum tubes, transistors, and the like. A common example of a reciproconductive circuit is the multivibrator or astable reciproconductive circuit. As used herein the term "multivibrator" is construed to include only the astable reciproconductive circuit, sometimes redundantly described as a "free-running multivibrator," whether synchronized or not. Another form of reciproconductive circuit is the monostable form which is sometimes referred to as a "trigger circuit" or a "self-restoring trigger circuit," or a "flip-flop."

While a general technique of automatically controlling the frequency of a reciproconductive circuit by grid bias variation is known, the circuit arrangement shown here in Fig. 2(a) is extremely simple and efficient for locking two widely differing frequencies. Preferably a circuit 91 in the anode circuit of the buffer pentode 90 is tuned to the reference sine wave, although a simple anode load resistor may be used as long as the input waveform on the grid of the reference amplifier tube 90 does not vary in amplitude. The reference sine wave is applied by way of a capacitor 92 to the anode of the diode element 94 at the cathode of which there is produced a sawtooth wave. The D.-C. component of this sawtooth wave is used to control the triggering time of the astable reciproconductive circuit 100 comprising two triode tubes 97 and 98. The direct current component of the sawtooth wave is applied to the grid of the reciproconductive tube 97 by means of a diode element 102 and a resistor 104 to synchronize the operation of the reciproconductive circuit 100. The output at the cathode of the reciproconductive tube 97 is a square wave of recurrence frequency ⅙ that of the frequency applied to the grid of the reference frequency input or buffer tube 90. The positive pulse on the cathode of the tube 97 is applied to the grid of an A. F. C. control tube 106. A capacitor 108 is connected to differentiate the negative pulse at the anode of the pulse amplifying triode 106, to apply the differentiated pulse to the cathode electrodes of diode elements 94 and 102 so as to present the amplified pulse for comparison purposes.

Referring to Fig. 4, there are shown waveforms obtained at the junction between the cathodes of the diode elements 94 and 102. In Fig. 4(a) there is shown the waveform of a differentiated negative pulse which would result if the reference frequency input to the buffer pentode tube 90 were reduced to zero. At Fig. 4(b) there is shown the waveform which would be present at the junction between the cathodes of the diode elements 94 and 102 if the input to the pulse amplifying tube 106 were reduced to zero. At Fig. 4(c) there is shown the waveform which appears at the junction of the diode element cathodes as the circuit actually operates.

Due to the dissymmetry of the negative pulse, shown in Fig. 4(a), the deviation of its differentiated negative portion is shorter in time duration than that of its positive portion, and is therefore suitable for superimposition upon the shorter duration, higher frequency reference wave of Figure 4(b). As the frequency relationship between the reference frequency and the output of the reciproconductive circuit changes, the negative portion of the negative pulse rides up or down on the reference waveform slope, causing the greatest change in the amplitude of the negative half cycle. This is rectified and converted into a D. C. component through the diode element 102 and is stored in a storage capacitor 110 from which it is applied to the grid of the reciproconductive tube 97 to maintain frequency stability. In adjusting the reciproconductive circuit 100 for stable operation, its free-running frequency is adjusted slightly higher than the desired output frequency so that the automatic control bias will force it into synchronism. In the circuit described a 6 to 1 ratio in frequency is very rigidly stabilized and it appears that considerably greater ratios of reference-to-operating frequency can be stabilized by a circuit of the type described.

The output of the blanking pulse signal generating circuit 24, which is at the cathode of the reciproconductive tube 97 of the reciproconductive circuit 100, is applied to the grid of a cathode follower tube 112 to develop a pulse potential, at 16.66 kc. in this application, across the cathode resistor 114 which pulse is coupled to the clamping pulse output terminals 25' by means of a capacitor 116. This clamping pulse is used to synchronize the operation of keyed clamping circuits in the apparatus under test without necessitating locking-in of the same to the clamp keying wave generating circuits of the apparatus under test. This is also used if the clamping circuit is designed for keying at a slightly different frequency, which is usually the case in the Western Hemisphere where such clamping circuits for television transmitters usually operate at or near 15.75 kc.

The output of the balanced modulator 16 is applied to a sideband wave amplifying circuit 22 comprising cascaded pentode tubes 84, 85 and a shunt regulated cathode follower stage having two triode tubes 86 and 87. This type of amplifier has been found to have excellent linearity and to provide a very low output impedance for presenting the amplified sidebands to the mixing circuit 26. Other high frequency amplifiers might be used, but the type specifically shown in Fig. 2 is preferred because it provides high gain with very good linearity.

Blanking pulses from the blanking pulse generating circuit 24 are mixed with the sideband components obtained from the sideband amplifier at the cathode of the triode 87. While several known forms of mixing circuits might be used for this purpose, the particular arrangement shown in Fig. 2(b) is preferred because the magnitude of the blanking signal pulse is readily controlled, and if desired the keying waveform may be entirely cancelled, a condition which is sometimes very useful. Also, if desired, the polarity of the blanking pulse in the composite test signal may be reversed merely at the turn of a knob. Basically the mixing circuit 26 herein described is an on-off keying circuit using the pulse output of the blanking signal generating circuit 24 for keying. The keying wave is applied to the input circuit of a phase splitting circuit comprising a triode paraphase amplifier tube 120. It may be desirable to use a stage of amplification prior to the tube 120 to insure the proper level. Two diode elements 123, 124 are connected in series across the anode-cathode path of the paraphase amplifier tube 120, with resistors 127, 128 arranged to reduce the loading effect of the diodes 123, 124 upon the paraphase amplifier tube 120. A shunt resistor 130 having an adjustable tapping arm 131 is connected across the series diode circuit. The arm 131 is capable of creating an unbalance in the output so that the keying waveform of desired polarity and amplitude is introduced into the output signal. The diodes 123 and 124 are so coupled to the driving paraphase amplifier tube 120 that the diodes are non-conducting if the pulse is of sufficient predetermined amplitude. The sideband components or other carrier frequency waves to be modulated or keyed are applied by way of a resistance element 125 (not always necessary) to the junction between the anode and cathode elements respectively of the series connected diode elements 123, 124 respectively. The keying arrangement as thus far described provides adequate performance but it is preferred that an additional circuit, comprising the series diode elements 203, 132 and a resistive element 133, which is shunted to ground by means of capacitors 134 and 135, be connected across the keying diodes 123, 124 to minimize the transients that are normally created when the diodes 123, 124 are driven into the non-conductive state.

Referring to Fig. 5, there are shown waveforms illustrating the operation of the mixing circuit 26 according to the invention. At Fig. 5(a) there is shown the sideband frequency components obtained at the junction of the tubes 86, 87. At Fig. 5(c) there is shown a waveform obtained at the test point terminal 138 when the arm 131 is electrically centered on the resistance element 130. When the arm is moved toward the cathode of the diode 123, a positive blanking pulse is produced as is shown at Fig. 5(b). In the waveform of Fig. 5(c) the D.-C. component is reduced to zero. At Fig. 5(d) there is shown the waveform which results when the arm 131 is varied toward the anode of the diode element 124 to produce a negative blanking pulse.

Thus, if a sinusoidal signal is desired with either positive or negative blanking pulses or having the sine waves blanked out along the A.-C. axis, it can be readily derived by use of the circuit arrangement shown in Fig. 2(b).

It is also possible to use the circuit arrangement shown to provide the given amount of signal set-up if it is desired to insert synchronizing pulses at this point. The arm 131 can be adjusted to provide a given magnitude of blanking signals with respect to the amplitude of the sine wave signal. In the envelope delay measuring equipment it is desirable to have a blanking signal magnitude of 25% above the amplitude of the sine wave sideband signal.

The composite test signal wave obtained at the arm 131 is applied to a straight 1-to-1 line amplifier comprising two triode tubes 141, 142 connected in cascade and two triode tubes 144, 145 connected as shunt regulated amplifiers. Actually, two sets of tubes connected in parallel are preferred for these stages. This line amplifier 28 has a low differential gain and phase distortion and provides a flat frequency response well beyond 10 mc., and envelope delay to ± 0.01 us. over that range. A version with parallel connected tubes was arranged to deliver the desired 1.73 volts peak-to-peak composite signal from a 75 ohm impedance to a 75 ohm load at the output terminals 29′ for application to the input terminals of the apparatus under test, which may be almost any type of television signal translating system such as switching systems, lap dissolve and special effects amplifiers, coaxial-cable or microwave circuits, transmitters and transmitter components both with or without clamping circuits and the like.

In operating the test signal generator shown in Fig. 2 a sine wave of the order of, but preferably not exceeding, 0.30 volt peak-to-peak, measured at the test point terminal 151, is applied to the grid of the carrier wave phase inverting tube 50. For initial testing and adjustment it is recommended that a signal of 400–500 kc. be used, as adjustments made in this range of frequencies appear to give optimum operation over the entire range of 200 kc. to 10 mc. From time to time, the oscillator 20 may be checked against a frequency standard, measuring the oscillator frequency at the test point 152. The oscillator output level control 62 should be adjusted to obtain a level of the order of 0.5 volt peak-to-peak at the test point 153, insuring that the sine wave is very pure. The carrier wave balancing potentiometer 52 and the modulator balancing potentiometers 81, 82, and the capacitor 78 are then adjusted to give a pure waveform at the test point terminal 154. The level at the test point terminal 155 at the output of the sideband amplifier 22 should be about 0.25 volt peak-to-peak. Next, the blanking pulse generating circuit 24 is checked at the test point terminal 156 to insure that the output frequency is 16.66 kc., and of the order of 3.2 volts peak-to-peak maximum and the pulse width is about 11 usec. The blanking pulse control 131 is then adjusted to provide 25% synchronizing signal amplitude and 75% sine wave signal amplitude, measuring at the test point terminal 138, as in a conventional composite television signal. By using the oscilloscope this can be adjusted by making the blanking pulse extend ⅓ of the signal peak-to-peak amplitude above, or below, the sine wave portion. The line amplifier gain control 143 in the cathode lead of the input amplifying tube 141 is adjusted to provide a signal of the order of 1.73 volts peak-to-peak at the output terminals 29′.

The output of the network or apparatus under test is applied to the input terminals 32′ of the envelope delay measuring or test signal measuring apparatus, where the test signal as modified by the apparatus under test is presented simultaneously to the input circuits of the tubes 161 and 202 of a signal separating circuit 34. Signal separation may be effected by assigning values to components of the input circuits to obtain filter network operation in known manner, but this is not necessary in the apparatus according to the invention, as will be seen hereinafter.

The entire signal is amplified by the triode amplifier tube 161. Part of the output of the input signal amplifying tube 161 is applied to a crystal diode element 164 which rectifies the sideband component signal and provides a D.-C. potential which is applied as bias on the grid of a D.-C. amplifier tube 166. The magnitude of this bias is a function of the amplitude of the sideband components of the test signal. As the amplitude increases the negative bias increases, which causes the anode potential of the D.-C. amplifier tube 166 to increase. A crystal diode device 170 is connected by means of a capacitor 171 to the anode of the amplifier tube 161 and by means of a resistor 172 to the anode of the D.-C. amplifier tube 166 to serve as the sideband-spacing frequency wave component detector. The detector crystal device 170 is non-conductive until the amplitude of the sidebands as applied to the input amplifying tube 161 is high enough to produce a bias at the grid of the D.-C. amplifier tube 166 to raise the anode potential sufficiently to unbias the detector crystal device 170 which passes the sideband frequency components but not the blanking pulse components. Thus, this portion of the circuit acts as a signal separator to exclude the blanking pulses and according to the invention no special filter circuit is required for this purpose. This provides very positive gating action, in the sense that the circuit passes no information at all when the signal level is reduced below a certain predetermined minimum value. At the same time, however, no amplitude compression is allowed to occur at the output point of the rectifier 170 leading to the resistor 172. The output of the sideband component detector 170 is in the form of an intermediate frequency wave and is selectively amplified by a pentode tube 176 having a resonant circuit 178 in the grid circuit and another resonant circuit 179 in the anode circuit both of which circuits are tuned to $\Delta f$, or 200 kc. in the instant application, to produce the $\Delta f$ or sideband-spacing frequency wave, as predicted from the result expressed in Equation (6) above. A voltage doubler circuit comprising two crystal rectifiers 181, 182 connected to the anode of the amplifier pentode 176 by means of a capacitor 183, is arranged to provide D.-C. bias for the grid electrodes of two D.-C. amplifier tubes 186, 187. The D.-C. amplifier tube 186 has a meter 189 in its anode circuit, for indicating the relative transmission of this system. The negative bias on the tubes 186, 187 increases as the signal across the resonant circuit 179 increases and the anode voltage output of the tubes 186, 187 also increases so that the meter 189 reads the anode potential which is directly proportional to the signal strength. The output of the other D.-C. amplifier tube 187 provide bias for the grid of a pentode tube 190 to the control grid of which the signal across the resonant circuit 179 is applied by means of a coupling capacitor 192. The pentode tube 190 is a second amplitude gating circuit. When no signal is present across the resonant circuit 179, no bias will appear on the grids of the D.-C. amplifier tubes 186 or 187. Both tubes then draw maximum anode current and therefore have minimum anode voltage. Minimum anode voltage on the D.-C. amplifier tube 187 is arranged to drive the grid of the pentode amplifying tube 190 very negative with respect to the cathode, cutting the tube 190 off. As signal across the resonant circuit 179 increases the D.-C. amplifier tube 187, which is a sharp cut-off tube, suddenly stops conducting, causing a rapid rise in the grid potential of the pentode amplifying tube 190, with the result that the signal is either present or absent, in response to a very small change of signal, across the resonant circuit 194 in the anode circuit of the second I. F. amplifier tube 190. A further pentode amplifier tube 196 is coupled to the pentode amplifier tube 190 and there is another resonant circuit 198 in its anode lead. The resonant circuits 179, 194 and 198 are all tuned to $\Delta f$ frequency, which in this example is 200 kc., and serve to reject the residue of the pulse and higher order components and thus present a clean 200 kc. signal at the anode of the final I. F. amplifier tube 196.

The test signal as modified by the apparatus under test, which is applied to the input terminals 32', is thereafter also applied to the grid of a pentode amplifier tube 202 in a straight high gain wide band amplifier arrangement. A further pentode amplifying tube 204 is coupled to the previous amplifier stage and is arranged to clip all of the sideband frequency components and amplify the blanking pulse components by thresholding action, so that only the blanking signal pulses appear at the anode of the pentode tube 204. Thus, the amplifying tube 204 performs the signal separating function. Further amplification at the blanking pulse frequency of 16.66 kc. is obtained by means of a further triode amplifier tube 206. Thereafter, amplification and frequency doubling is obtained by a triode tube 208, having a resonant circuit 210 in the anode lead which is tuned to 33.33 kc. A variable capacitor 212 is connected between the anode and cathode of the doubler tube 208, for use in meter phase calibration. A subsequent triode tube 214 acts as a frequency tripler producing a 100 kc. signal in the resonant circuit 216 connected to the anode, after which a buffer tube 218 having a resonant circuit 220 also tuned to 100 kc. in its anode circuit is used to drive another doubler triode 222 having a resonant circuit 224 tuned to 200 kc. in its anode circuit. A further buffer amplifier tube 228 reduces further harmonic content of the signal to produce a clean 200 kc. reference sine wave at the anode of the tube 228 and at the grid of the following triode 234, which is a phase splitter of the paraphase amplifier type.

The phase of the sideband-spacing frequency wave appearing across the resonant circuit 198 is compared with the reference signal, which is the blanking pulse components at 16.66 kc. multiplied up to 200 kc. and appearing across the resonant circuit 230. The reference signal has been shifted in phase by constant amount depending upon the transmission time of the apparatus under test. It is important only that the relative envelope delay be known, in so far as accurate transmission of video signal to a television receiver is concerned. Therefore, the envelope delay characteristic to be measured is the relative delay time between the sideband components, and the blanking pulse components the latter of which are substantially in-phase insofar as operation of the receiver is concerned.

The sideband components are amplified in a triode amplifying tube 232 and applied to a balanced modulator type of phase detector, along with phase and antiphase reference signal components obtained from a balanced phase splitting tube 234. The anode of the sideband component amplifier tube 232 is connected to the cathodes of the diodes 245, 246 and is also connected to the arm of the variably tapped resistor 247, the terminals of which are connected to the anodes of two other diodes 248, 249. A high resistance galvanometer or other D.-C. meter 250 is connected across the resistance element 247 and a pair of capacitors 251, 253 are shunted across the meter 250 with the junction thereof connected to a point of fixed reference potential, shown here as ground. The additive or subtractive phases between the phase-antiphase components of the reference signal and the signal whose phase is to be compared produce differing values of charge in the coupling capacitors 241, 242. This causes differing values of current to flow through the diodes 245, 246. The diodes 248, 249 are added to the basic circuit to increase the sensitivity and to isolate the indicating meter 250 from the A.-C. circuit. The indicating meter is also grounded as far as the A.-C. component is concerned. Capacitors 251, 253 are charged through the diodes 248, 249 from the charge on the coupling capacitors 241, 242. This charge transfer is augmented by additional charging current obtained from the remaining half cycle of current from the paraphase amplifying tube 234. The variable tapping on the resistance element 247 is used for balancing the capacitor discharge so that the meter 250 shows the difference in potential across the capacitors 251, 253 and may be zeroed when only the reference signal from the paraphase amplifier 234 is present. While the basic arrangement of this diode phase comparator may be replaced by one of the prior art arrangements, the particular circuit shown is preferred because the addition of the diodes 248, 249 provides additional increased sensitivity and permits isolating the indicating meter 250 from the A.-C. circuit.

If a high impedance zero-center meter is not available, the more conventional phase comparing circuit shown in Fig. 6 may be used. The reference signal at the anode of the amplifier tube 228 is split into phase and antiphase components, either in the paraphase amplifier shown in Fig. 3(b) or by using the center tapped resonant circuit 230' as shown in Fig. 6, and is applied by way of a pair of coupling capacitors 260, 261 to a pair of unilateral impedance devices or diodes 264, 265. The phase splitting tube output is applied to a bridge circuit comprising the two diode elements 264, 265 forming a phase comparing circuit which is essentially a balanced modulator. The additive or subtractive phases between the voltages in phase-antiphase relationship as derived from the phase splitting tube 228 and the test signal from the amplifier tube 232 establish differing values of charge on the capacitors 262, 263. The differential voltage across the capacitors 262, 263 is measured by means of a vacuum tube voltmeter comprising two triode metering tubes 267, 268 and a zero center scale direct current meter 250' which may be of rather low sensitivity. Coarse meter sensitivity is varied by switching resistors 271—273 by means of a switch 274 and fine sensitivity is varied by adjusting a variable resistor 276. The D.-C. meter balance is obtained by adjusting a potentiometer 278 in the anode circuit, and A.-C. meter balance is obtained by adjusting the potentiometer 280 to make the meter 250' read zero, that is to read half scale, when the reference signal only is present. While other phase comparing and metering circuits may be used with satisfactory results, the circuit arrangement shown is recommended because the input is grounded insofar as A.-C. is concerned, and the indicating meter is completely isolated from the A.-C. circuit.

In operation, the level of signal at the cathode of the tube 232, measured at the test point 266, should be of the order of, but not exceed, 25.0 volts peak-to-peak at 200 kc. with negative pulse output from the transmitter. The potentiometer 280, which is a dynamic A.-C. balance control, is adjusted to produce zero reading on the meter with the reference signal only applied. With a signal of the order of 0.30 volt peak-to-peak carrier wave signal of 400–500 kc. applied to the input of the transmitter, the signal level at the cathode of the phase splitting tube 228, measured at the test point terminals 269, should be of the order of, but not exceed, 10.0 volts peak-to-peak. After these conditions are realized, the meter phase calibration capacitor 212 is adjusted for a maximum reading on the meter 250' and the meter is then adjusted by varying the sensitivity control for exact full scale meter deflection. Then the meter phase calibration capacitor is readjusted for equal and opposite meter indication, after which the meter is zeroed by similar means, and then the test signal measuring apparatus is ready for use.

The relative envelope delay time is given by $$T_E = \frac{\Delta\phi}{2\pi\Delta f} \tag{9}$$

With $\Delta f = 200$ kc./s. the above becomes $$T_E = \frac{\Delta\phi}{2\pi \times .200} \times 10^6 = 0.796 \times 10^{-6} \Delta\phi \tag{10}$$

If a 100 μa meter reads 0° to 90° from center scale to full scale it reads $50 \times 10^{-6} \sin \Delta\phi$ or if $I_m$ is in μa from full scale Then
$$20 \ I_m = \sin \Delta\phi$$

$$\Delta\phi = \sin^{-1} 20 \ I_m$$

Envelope delay is then $$T_E = 0.796 \times 10^{-6} \sin^{-1} 20 \ I_m \text{ seconds} \quad (11)$$

As mentioned earlier, the meter is preferably calibrated in degrees from −90 to +90. At 200 kc., 90° equals +1.25 microseconds. Thus, at this frequency the meter reads from −1.25 to +1.25 microseconds. The calibration is therefore

| Degrees: | Microseconds |
|---|---|
| 0 | 0 |
| 5 | .0444 |
| 10 | .0886 |
| 15 | .1332 |
| 20 | .1783 |
| 25 | .2240 |
| 30 | .2704 |
| 35 | .3178 |
| 40 | .3665 |
| 45 | .4167 |
| 50 | .4687 |
| 55 | .5232 |
| 60 | .5806 |
| 65 | .6422 |
| 70 | .7091 |
| 75 | .7839 |
| 80 | .8713 |
| 85 | .9835 |
| 90 | 1.2500 |

Additional sensitivity is realized in Fig. 6 by changing the resistance shunting the meter by means of the Coarse Meter Sensitivity control switch 274.

It is important to note that with the test equipment according to the invention, the percentage error is essentially the error of the meter 250 only. This is brought about by the fact that the ±90° phase conditions are established as boundaries in the initial adjustment, and the error of the meter is the only error present in either the mean (zero set) or extreme readings. The meter error with most meters of the type suitable for this purpose does not exceed ±1% of full scale.

The values of component parts for the circuit arrangements of Figs. 2 and 3 with the detector circuit of Fig. 6 listed below were used to obtain satisfactory operation of test equipment according to the invention and are herein set forth by way of illustration only.

| Ref. No. | Component | Type or Value |
|---|---|---|
| 50 | Phase inverter | ½ 6BK7. |
| 52 | Carrier level adjustment | 75 ohms. |
| 54 | Oscillator tube | 6AU6. |
| 56 | Voltage regulator tube | OA2. |
| 62 | Sine wave level adjuster | 500 ohms. |
| 64 | Paraphase amplifier | ½ 6BK7. |
| 66–69 | Diode elements | 1N100. |
| 77 | Bridge capacitor | 47 mmf. |
| 78 | do | 17–55 mmf. |
| 81 | Balance adjustment | 2000 ohms. |
| 82 | Coupling capacitors | 0.02 mf. |
| 83 | do | 0.1 mf. |
| 84 | Sideband amplifier tube | 6CB6. |
| 85 | do | 6AQ5. |
| 86, 87 | Sideband amplifier tubes | 12BH7. |
| 90 | Buffer amplifier | ½ 6U8. |
| 92 | Coupling capacitor | 0.03 mf. |
| 94 | Diode element | ½ 6AL5. |
| 97, 98 | Reciproconductive tubes | 12AX7. |
| 102 | Diode element | ½ 6AL5. |
| 104 | Series resistor | 820 kilohms. |
| 106 | Pulse amplifying tube | ½ 6U8. |
| 108 | Coupling capacitor | 330 mmf. |
| 110 | Storage capacitor | 0.004 mf. |
| 112 | Cathode follower | 12BH (paralleled). |
| 114 | Cathode resistor | 300 ohms. |
| 116 | Coupling capacitor | 1000 mf. |
| 120 | Paraphase amplifier | ½ 12BH7. |

| Ref. No. | Component | Type or Value |
|---|---|---|
| 123, 124 | Diode elements | 1N100. |
| 127, 128 | Series resistors | 1,000 ohms. |
| 130 | Load potentiometer | 1,000 ohms. |
| 131, 132 | Diode elements | 6AL5. |
| 133 | Resistive element | 18 kilohms. |
| 134, 135 | Capacitive elements | 0.25 mf. |
| 141, 142 | Line amplifier | 417A. |
| 143 | Gain control | 80–120 ohms. |
| 144, 145 | Amplifying tube | 2 6BX7 paralleled. |
| 161 | Input amplifier tube | 417A. |
| 164 | Crystal diode | 1N100. |
| 166 | D.-C. amplifying tube | ½ 12AX7. |
| 170 | Crystal detector | 1N100. |
| 176 | Amplifying tube | 6AH6. |
| 181, 182 | Crystal rectifier | 1N100. |
| 186, 187 | D.-C. amplifying tube | 12AX7. |
| 190 | Amplifier tube | 6AH6. |
| 196 | do | 6AH6. |
| 202 | Input amplifier tube | 6CL6. |
| 204 | Amplifier tube | 6AH6. |
| 206, 208 | Amplifier-doubler | 12AX7. |
| 212 | Phase calibrator | 5–100 mmf. |
| 214 | Tripler tube | ½ 12AT7. |
| 218 | Buffer tube | ½ 12AT7. |
| 222 | Doubler tube | ½ 12AT7. |
| 216 | Resonant circuit | 100 kc. |
| 220 | do | 100 kc. |
| 224 | do | 200 kc. |
| 228 | Buffer triode | ½ 12AT7. |
| 230 | Resonant circuit | 200 kc. |
| 232, 234 | Amplifier tubes | 12BH7. |
| 260, 261 | Capacitors | 0.1 mf. |
| 262, 263 | do | 220 mmf. |
| 264, 265 | Balanced modulator elements | 6AL5. |
| 267, 268 | Meter tubes | 12BH7. |
| 276 | Fine meter adjustment | 33–283 kilohms. |
| 278 | D.-C. meter balance | 5,000 ohms. |
| 280 | A.-C. balancing adjustment | 660 kilohms. |

The power supplies were set to deliver 285 volts D.-C. energizing potential, the positive pole at the points marked with the plus (+) sign and the negative pole at ground potential.

Obviously, other values will be suggested to those skilled in the art for adapting the invention to applications other than that illustrated above.

The invention claimed is:

1. In a system for measuring the relative envelope delay time of electric wave translating apparatus, test signal generating apparatus including a sideband-spacing frequency wave producing circuit, means to apply a carrier signal wave to said circuit, a modulating-wave oscillating circuit coupled to said first-mentioned circuit, a wave amplifying circuit coupled to the output of said first-mentioned circuit, a blanking signal pulse generating circuit coupled to said oscillating circuit to produce blanking signal pulses at a predetermined recurrence frequency, a frequency locking circuit interposed between said oscillating circuit and said generating circuit to maintain said blanking signal pulses precisely at said predetermined frequency, a mixing circuit coupled to said wave amplifying circuit and said generating circuit to interpose blanking signal pulses in the sideband-spacing frequency wave to form a test signal wave, a line matching and amplifying circuit coupling the output of said mixing circuit into the input circuit of the electric wave translating apparatus under test, and connections between said generating circuit and said translating apparatus to energize any clamping circuits in said translating apparatus; and test signal measuring apparatus including signal separating means connected to the output circuit of said translating apparatus, a sideband-spacing frequency wave demodulating circuit coupled to said separating means, a wave amplitude limiting circuit coupled to said demodulating circuit, a frequency multiplying circuit coupled to said separating means to multiply the blanking pulse recurrence frequency up to said sideband-spacing frequency, a wave amplitude limiting circuit coupled to said frequency multiplying circuit, a phase comparing circuit coupled to both of said amplitude limiting circuits to determine the relative phase displacement between the outputs of said limiting circuits, and an indicating circuit coupled to said comparing circuit to express said phase displacement in terms of relative envelope delay.

2. In test equipment for measuring the relative envelope delay time of electric wave translating apparatus, test signal generating apparatus including a sideband-spacing frequency wave producing circuit, means to apply a carrier signal wave to said circuit, a modulating-frequency wave oscillating circuit coupled to said first-mentioned circuit, a blanking signal pulse generating circuit coupled to said oscillating circuit to produce blanking signal pulses at a predetermined recurrence frequency, a mixing circuit coupled to said first-mentioned circuit and said generating circuit to interpose blanking signal pulses in the sideband-spacing frequency wave to form a test signal wave, and means to couple the output of said mixing circuit into the input circuit of the electric wave translating apparatus under test; and test signal measuring apparatus including signal separating means, means to couple said separating means to the output circuit of said translating apparatus, a sideband-spacing frequency wave demodulating circuit coupled to said separating means, an amplitude limiting circuit coupled to said demodulating circuit, a frequency multiplying circuit coupled to said separating means to multiply the blanking pulse recurrence frequency up to said sideband-spacing frequency, an amplitude limiting circuit coupled to said frequency multiplying circuit, a phase comparing circuit coupled to both of said amplitude limiting circuits to determine the relative phase displacement between the outputs of said limiting circuits, and an indicating circuit coupled to said comparing circuit to express said phase displacement in terms of relative envelope delay.

3. Test signal generating apparatus including a sideband-spacing frequency wave producing circuit, means to apply a carrier signal wave to said circuit, a modulating-frequency wave oscillating circuit coupled to said first-mentioned circuit, a blanking pulse signal generating circuit coupled to said oscillating circuit to produce blanking signal pulses at a predetermined recurrence frequency, a frequency locking circuit interposed between said oscillating circuit and said generating circuit to maintain said blanking signal pulses precisely at said predetermined frequency, and a mixing circuit coupled to said first-mentioned circuit and said generating circuit to interpose blanking signal pulses in the sideband-spacing frequency wave to form a test signal wave.

4. Test signal measuring apparatus having a test signal input circuit receptive of a signal having a sine wave form of given frequency interspersed with pulses recurring at a frequency harmonically related to said given frequency, a given frequency wave demodulating circuit coupled to said input circuit, an amplitude limiting circuit coupled to said demodulating circuit, a frequency multiplying circuit coupled to said input circuit to multiply the pulse recurrence frequency of said signal up to said given frequency, an amplitude limiting circuit coupled to said frequency multiplying circuit, a phase comparing circuit coupled to both of said amplitude limiting circuits to determine the relative phase displacement between the outputs of said limiting circuits, and an indicating circuit coupled to said comparing circuit to express said phase displacement in terms of relative envelope delay.

References Cited in the file of this patent

UNITED STATES PATENTS

| | | |
|---|---|---|
| 2,416,310 | Hansen | Feb. 25, 1947 |
| 2,442,317 | Usselman | May 25, 1948 |
| 2,483,262 | Cosman | Sept. 27, 1949 |
| 2,525,448 | Clarke | Oct. 10, 1950 |
| 2,651,722 | Bergfors | Sept. 8, 1953 |
| 2,672,588 | Vanous | Mar. 16, 1954 |
| 2,685,062 | Schroeder | July 27, 1954 |
| 2,695,962 | Nibbe | Nov. 30, 1954 |
| 2,700,133 | Pfleger | Jan. 18, 1955 |
| 2,767,373 | Maggio | Oct. 16, 1956 |